United States Patent [19]

Couch

[11] Patent Number: 4,543,664
[45] Date of Patent: Sep. 24, 1985

[54] DIRECT CURRENT COUPLED DATA TRANSMISSION

[75] Inventor: Philip R. Couch, Roanoke, Va.

[73] Assignee: International Telephone and Telegraph Corporation, New York, N.Y.

[21] Appl. No.: 110,873

[22] Filed: Jan. 10, 1980

[51] Int. Cl.[4] ............................................. H04B 9/00
[52] U.S. Cl. .................................. 455/601; 455/610; 455/619
[58] Field of Search ............... 455/601, 608, 610, 602, 455/617, 619; 375/99, 3, 4, 43; 358/284, 166, 167, 177, 174; 328/164

[56] References Cited

U.S. PATENT DOCUMENTS

| | | | |
|---|---|---|---|
| 3,729,633 | 4/1973 | Eros et al. | 455/619 |
| 3,876,939 | 4/1975 | Lerner | 455/43 |
| 3,906,366 | 9/1975 | Minami et al. | 455/608 |
| 3,985,970 | 10/1976 | Lerault et al. | 375/4 |
| 4,019,048 | 4/1977 | Maione et al. | 455/608 |
| 4,054,794 | 10/1977 | Laughlin et al. | 455/43 |
| 4,091,734 | 5/1978 | Redmond et al. | 455/608 |

*Primary Examiner*—John C. Martin
*Assistant Examiner*—Edward L. Coles
*Attorney, Agent, or Firm*—John T. O'Halloran; Peter R. Ruzek

[57] ABSTRACT

A fiber optic direct current coupled data transmission link having a response extending to dc by using a dc coupled receiver and a modified frequency response to avoid data width distortion which allows the dc coupled receiver to work over a wide range of input signal levels.

10 Claims, 7 Drawing Figures

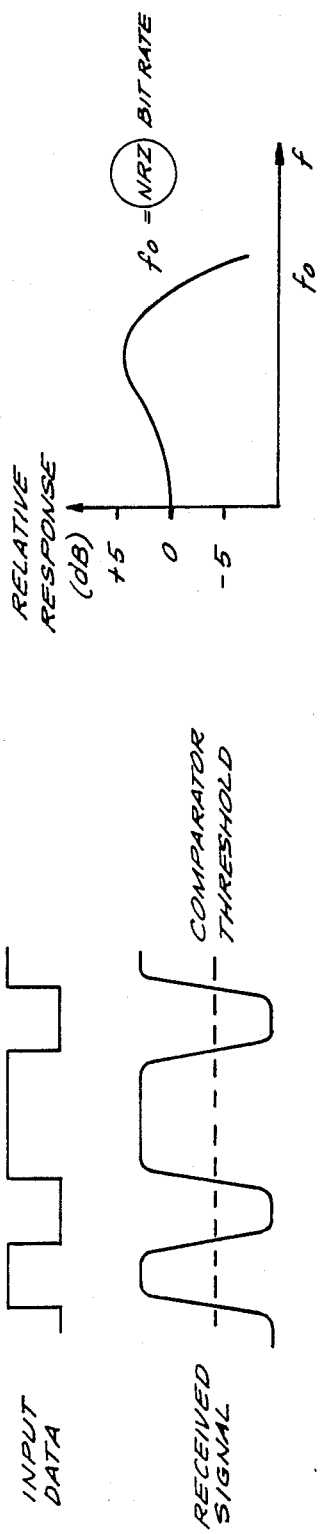
FIG. 1
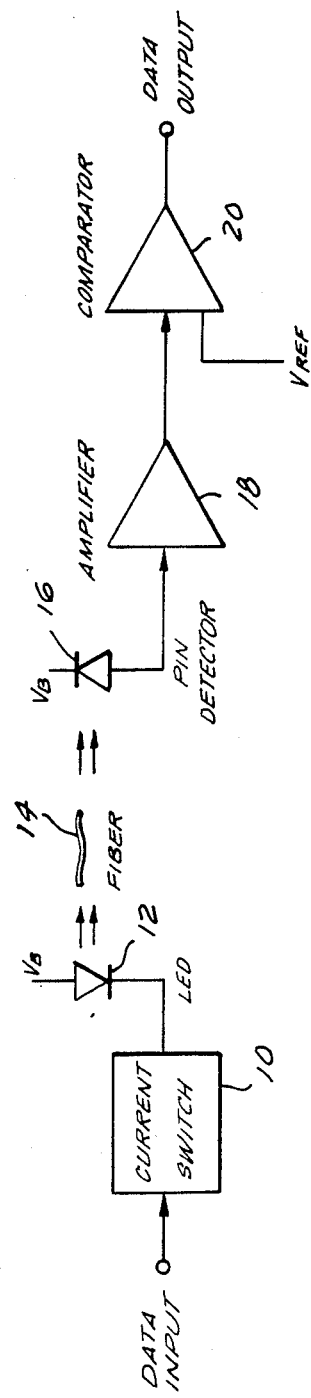
FIG. 5
FIG. 2

DIRECT CURRENT COUPLED DATA TRANSMISSION

FIELD OF THE INVENTION

The present invention relates to improvements in direct current coupled data transmission.

BACKGROUND OF THE INVENTION

There presently exists numerous means to provide for data transmission some of which utilizes optical fibers. In present fiber optic data transmission links or systems they often transmit data which includes a long period of high or low state. Such data is normal when it is not coded in any way and the system may rest in either state.

When coded data is transmitted through the fiber, this usually involves a transmitter and an ac coupled receiver with additional circuitry to convert the data into pulses or other simple code to enable the receiver to detect the signal which is then converted back to the original form. However, this additional coding circuitry is usually complex and tends to restrict the use of the data link by reducing the modulation bandwidth and sensitivity of the receiver for effective operation.

The complexity of the coding circuitry could be reduced if the link could be made to respond to dc signals.

Several attempts have been made to fabricate a transmitter and receiver with a dc response. Some techniques which are employed use coding and decoding systems incorporated into the transmitter and receiver respectively. This leads to a complex and relatively expensive arrangement to effectuate such transmission, which is undesirable.

As shown in FIG. 1, direct current coupled transmitters and receivers may be used without the coding and decoding systems, however with present designs certain difficulties exist, especially when the range of input signal varies widely. The first difficulty is that of dc instability with time and temperature but this may be corrected through the use of operational amplifiers and careful design and may be overcome.

A second difficulty is more critical and involves data width distortion of the signal, as for example shown in FIG. 3. This distortion is essentially the difference in delay for low to high and high to low transitions resulting in narrower or wider pulses from the receiver than originally transmitted. Data width distortion with varying input signal levels limits the usefulness of a dc coupled link.

To avoid this, the receiver, which detects the different optical power levels, utilizes a comparator with its threshold ideally set at half the peak signal level so that data width distortion is not critical. However, the present techniques used to monitor the peak signal level and set the comparator threshold cannot operate for very long low states where the threshold control circuit is required to anticipate the following high state or peak signal level.

SUMMARY OF THE INVENTION

It is an object of the present invention to provide for a direct current data transmission system which is relatively small in size and simple in design but reliable in performance and which eliminates the need for complex techniques.

Another object of the present invention is to provide for such a system which reduces data width distortion and allows for only small sensitivity penalties to be paid in relation to the noise limit and as compared to similar designs.

A yet further object of the present invention is to provide for such a system which eliminates the manual adjustment of the equipment at installation or in service aside from perhaps an operational amplifier offset adjustment which is commonly required.

Another object of the present invention is to eliminate complex coding of the dc signal and allow for the use of a simple on-off transmitter.

A feature of the present invention is the use of an optical transmitter and receiver which are dc coupled via an optical fiber. The transmitter is essentially of a simple on-off type with the receiver being of a differential type design.

To regenerate the data, the receiver uses a comparator following an input amplifier with a network therebetween which modifies the receiver frequency response such that an overshoot occurs as the signal changes from a high level to a low level. There is no need to continually adjust the comparator level since the signal now crosses the comparator threshold at a time relative to the change in data state which may be bounded even for large variations in the input signal level and without the necessity of complex circuitry as aforementioned. The data width distortion which usually occurs in dc transmissions is compensated for by the magnitude of the overshoot which allows for a compromise between distortion and sensitivity.

BRIEF DESCRIPTION OF THE DRAWINGS

The above mentioned and other features and objects of this invention will become more apparent by reference to the following description which is to be taken in conjunction with the drawings:

FIG. 1 depicts the waveforms in an ideal dc data transmission link.

FIG. 2 is a somewhat schematic representation of an optical fiber direct current coupled data transmission link.

FIG. 5 is a graphical representation of the curve of the typical modified frequency response incorporating the teachings of the present invention.

DETAILED DESCRIPTION OF THE DRAWINGS

Figure 3:
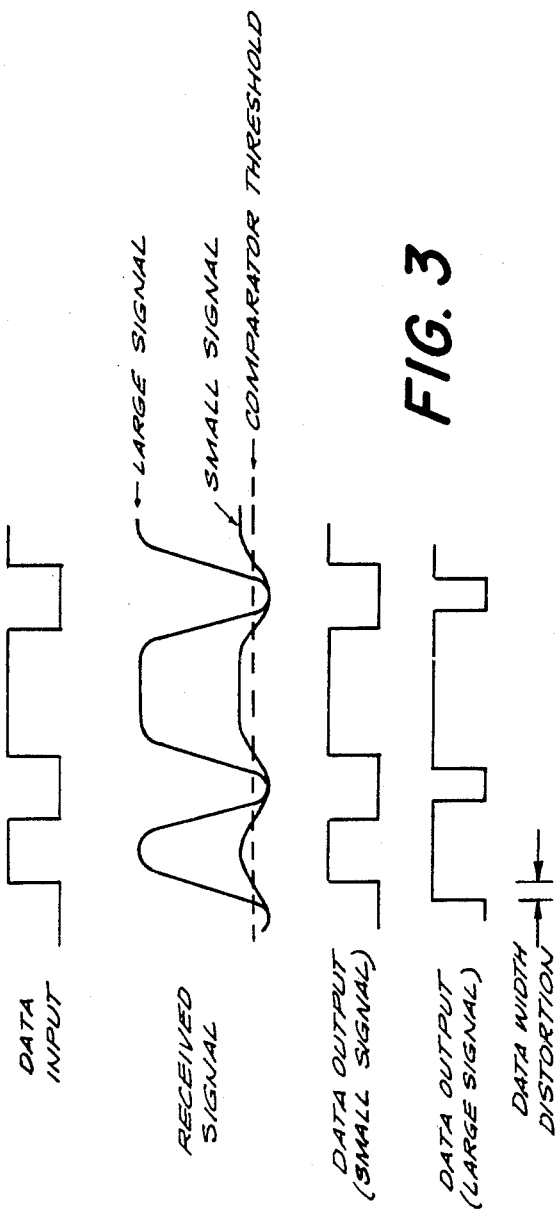
FIG. 3 depicts the waveforms in a realistic dc data transmission link having data width distortion.

The concept of using a simple dc coupled transmitter and receiver in a fiber optic data transmission link in the past can be seen in FIG. 2. In this regard, at the transmitter end, data input is controlled by a current switch 10 which is connected to a light emitting diode LED 12, having its opposite end connected to a biasing potential $V_B$. Of course, any alternate light emitting device suitable for purpose may be utilized if so desired.

The LED 12 is coupled to an optical fiber 14 on one end, having its other end connected to the receiver of the signal which is initially a photodetector diode, or PIN detector 16. The current switch 10 and LED 12 serve to provide a dc signal which is conveyed optically to the PIN detector 16 whose output is fed into amplifier 18, having its other end connected to a biasing potential $V_B$. In order to regenerate the data, the output of amplifier 18 is then directed to a comparator 20 along with a reference voltage Vref. The comparator 20 threshold level is usually maintained at half the peak signal level and its output should then be essentially the same as the data input to the current switch 10.

The idealized wave forms are shown in FIG. 1, with the input data being the same as the output data and the comparator threshold maintained at half the peak signal level to provide such a result. However, while this much would provide a dc coupled transmission link, under such circumstances it would be with excessive data width distortion if the receivers bandwidth is close to optimum, i.e., being just sufficient to transmit the data without amplifying higher frequency noise. This can be seen clearly in FIG. 3, where the comparator threshold is set low and while the data output for a small signal received is acceptable, for a large signal, the data output shows a marked amount of data width distortion which is unacceptable.

Figure 4:
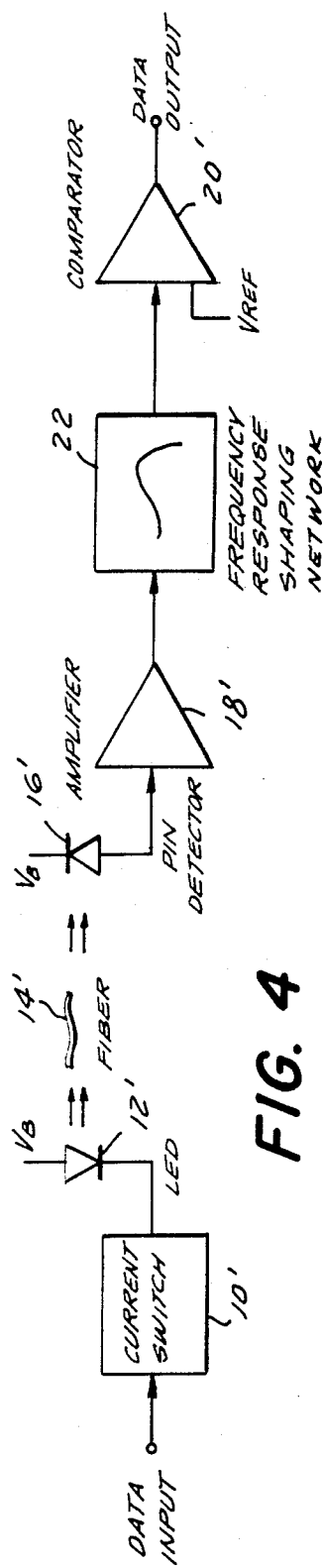
FIG. 4 is a somewhat schematic representation of an optical fiber direct current coupled data transmission link having a modified frequency response incorporating the teachings of the present invention.

To avoid data width distortion and allow the dc coupled receiver to work over a wide range of input signal levels, an improved data transmission system as shown in FIG. 4 must be utilized. Again, in this system, the transmitter and receiver are both dc coupled, and parts relating to earlier drawings are similarly numbered and designated with a prime.

Figure 6:
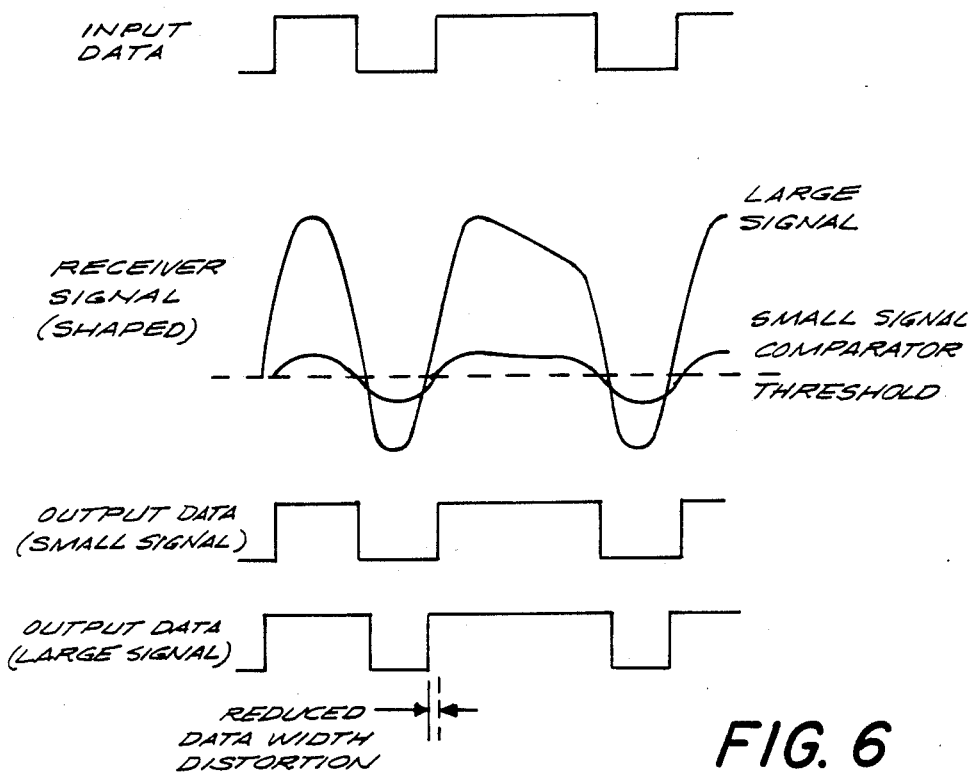
FIG. 6 depicts the waveforms in the typical optical fiber direct current coupled data transmission link having a modified frequency response incorporating the teachings of the present invention.

The receiver is modified from that in FIG. 2 and generally uses a differential type design and low drift operation input amplifier 18' to avoid dc instability. A comparator 20' is used following the input amplifier 18' having its threshold fixed just above the low level noise. This can be seen in FIG. 6 which shows the waveforms in the modified system of FIG. 4. A frequency response shaping network 22 is incorporated between the amplifier 18' and the comparator 20' which modifies the receiver frequency response as desired, such that an overshoot occurs as the signal changes between a high level and low level. A curve of a typically modified frequency response is shown in FIG. 5. It may be seen therein that the response shaping network 22 provides a relative response to gain (expressed in decibels) which differs for different frequencies of the data signal, that is, first slightly rises and then precipitously drops as the frequency increases. Thus the signal crosses the comparator threshold at a time relative to the change in data state which may be bounded even for large variations in input signal level as illustrated in FIG. 6.

For the smallest detectable signal level, the signal swings approximately equally either side of the threshold. By symmetry, this may be seen to produce no data width distortion in the small signal case. A defined maximum distortion occurs with large signals. This maximum may be controlled by the degree of overshoot and the optimization of this overshoot magnitude is part of a compromise between distortion and sensitivity. Excessive gain or bandwidth in the receiver may result in noise amplification proportionally greater than signal amplification, which leads to reduced sensitivity and should be considered.

Figure 7:
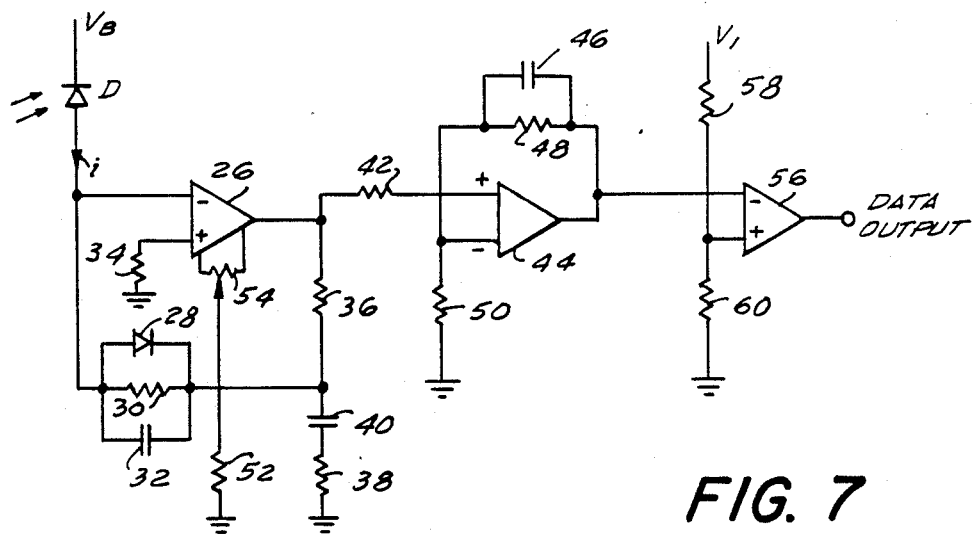
FIG. 7 is a schematic of the circuit of the optical receiver incorporating the teachings of the present invention.

In FIG. 7 there is shown a representative circuit schematic of the optical receiver. The photodetector diode D conducts a current i which is in proportion to the incident light power, and is directed to the inverting input of amplifier 26 and the parallel arrangement of diode 28, resistor 30 and capacitor 32. The non-inverting input of said amplifier 26 is grounded via resistor 34.

The amplifier 26 has band shaping due to resistors 36 and 38 and capacitor 40 in the feed back loop which causes increased gain with frequency in the upper portion of the receiver bandwidth as previously discussed.

The output of amplifier 26 connects via resistor 42 to the non-inverting input of amplifier 44 having a feed back loop with capacitor 46 and resistor 48 connected to the inverting input of said amplifier and to ground via resistor 50. Capacitors 32 and 46 provide a falling gain above the receiver band to limit the amplification of noise outside the signal bandwidth. Diode 28 serves as a non-linear feed back element to limit the maximum output signal of amplifier 26 and so increase the receiver large signal range. Resistors 52 and 54 provide an offset control to compensate for amplifier imbalance. Amplifier 44 serves to boost the signal level from amplifier 26 to suit the input of voltage comparator 56. The reference level $V_1$ of the comparator is set by resistors 58 and 60 and would be a little above zero volts.

What is evident is that the aforementioned circuit is relatively simple but effective as compared to prior techniques in direct current data transmission systems and once initially adjusted may operate effectively without further adjustments during operation. The user may choose the design overshoot as desired to suit the particular situation adding to the versatility of the system. For example, it has been found that with a design overshoot of approximately 50%, data width distortion is reduced to about 10% maximum distortion at non-return-to-zero data rates up to the 3 dB bandwidth.

It might also be noted that the present invention may be used in other applications where data is to be regenerated and the decision threshold is not known. These would include any data receiver which detects a carrier such as radio, microwave, and optical data links. In addition, certain applications may be found in ac coupled receivers and data replay from magnetic tape.

Although a preferred embodiment of the invention has been disclosed and described in detail herein, its scope should not be limited thereby, but rather its scope should be determined by that of the appended claims.

What is claimed is:

1. In a data transmission link for transmitting and regenerating data, a receiving means adapted to receive a data signal and capable of providing a data output responsive to said signal, said receiving means including a frequency response shaping network having means for modifying the shape of the data signal to provide for a predetermined overshoot as the signal changes energy levels to give the data output a reduced data width distortion by providing different gains for different frequency components of said data signal with the gain increasing with frequency in the upper portion of the receiving means band and falling above such band.

2. A data transmission link for transmitting and regenerating data comprising transmitting means capable of receiving a data input and providing a direct current signal responsive to said input; receiving means coupled to said transmitting means and capable of providing a data output responsive to said direct current signal, said receiving means including a frequency response shaping network having means for modifying the shape of the data signal to provide for a predetermined overshoot as the signal changes energy levels to give the data output a reduced data width distortion by providing different gains for different frequency components of said data signal with the gain increasing with frequency in the upper portion of the receiving means band and falling above such band.

3. The device in accordance with claim 2 which includes an optical fiber through which said signal is optically transmitted from said transmitting means to said receiving means.

4. The device in accordance with claim 3 wherein said transmitting means includes a radiation emitting means having a signal output that varies proportionally to the level of data input; said receiving means includes a photodetector means whose output various proportionally to the radiation received; and said optical fiber is coupled to said emitting means and said photodetector means to provide said optical transmission.

5. The system in accordance with claim 4 wherein said emitting means is a light emitting diode and said photodetector means is a photo sensitive diode.

6. The device in accordance with claims 1, 2, 3, 4 or 5 wherein said receiving means includes an amplifier circuit which amplifies the output signal; and a comparator which receives said output, compares it to a reference voltage, and provides a data output in accordance thereto.

7. The device in accordance with claim 6 wherein the comparator threshold level is set slightly above zero volts and the predetermined overshoot is set in the range of 50% of the value of the energy level change.

8. A method of providing direct current data transmission, including the following steps:
  generating an optical signal in response to data input;
  transmitting said optical signal in a predetermined path from an input to an output end;
  transforming said optical signal received at said output end into an electrical signal;
  modifying the shape of said electrical signal to provide a predetermined overshoot in the modified signal as said electrical signal changes energy levels to give the data output a reduced data width distortion by providing different gains for different frequency components of said electrical signal with the gain increasing with frequency in the upper portion of the receiving means band and falling above such band;
  comparing the modified signal to a present reference voltage;
  generating a data output resulting from said comparison.

9. The method in accordance with claim 8 wherein said optical signal is transmitted through an optical fiber.

10. The method in accordance with claims 8 or 9 which further includes the steps of setting the comparator threshold level slightly above zero volts and the predetermined overshoot in the range of 50% of the value of the energy level change.

* * * * *